UNITED STATES PATENT OFFICE.

EDUARD R. SCHROETER, OF JERSEY CITY, NEW JERSEY.

ARTIFICIAL STONE.

SPECIFICATION forming part of Letters Patent No. 377,173, dated January 31, 1888.

Application filed March 24, 1887. Serial No. 232,245. (No specimens.)

*To all whom it may concern:*

Be it known that I, EDUARD RUDOLF SCHROETER, a citizen of the German Empire, residing at Jersey City, Hudson county, State of New Jersey, have invented a new and Improved Artificial Stone, of which the following is a specification.

This invention relates to artificial stone that may be attached in the shape of veneers to boxes, furniture, and other objects. The artificial stone is provided with veins or dots of irregular shape, so as to imitate marble or other stones.

In producing my improved artificial stone I proceed as follows: Twenty-five parts of cellulose are boiled in water to make a thick paste. Fifteen parts of glue (preferably fish-glue) and fifteen parts of dextrine are separately dissolved and are then mixed with the cellulose. Five parts of alum dissolved in water are also embodied into the mixture. Twenty parts of powdered carbonate of lime and twenty parts of powdered soapstone are kneaded into the mass, so as to produce a dough. The resultant mass is now divided into small lumps, and each lump is differently colored by a suitable coloring agent. Next different quantities of the different lumps are intermixed. The lumps will not flow into each other, but will produce streaks, veins, or dots of different colors. In this way the lump which is to produce the ground-color is ornamented to suit the taste and in imitation of marble or other stone. The lump is then rolled out into a veneer, and this veneer is glued upon the article to be covered. The surface of the veneer may be polished or otherwise finished, when it will present a beautiful appearance.

Possibly the dextrine and alum may be omitted, but the result would be inferior to that obtained when these materials are used. The soapstone imparts a fine or even appearance to the mass, the alum makes it more compact, and the dextrine serves as a binding agent.

What I claim is—

A composition to imitate stone, and consisting of carbonate of lime, cellulose, glue, soapstone, and coloring-matter, substantially as specified.

E. R. SCHROETER.

Witnesses:
    F. V. BRIESEN,
    WILLIAM PARTINGTON.